United States Patent
Flachs et al.

(10) Patent No.: US 7,676,003 B2
(45) Date of Patent: Mar. 9, 2010

(54) CARRIER FREQUENCY-INDEPENDENT RECEIVER

(75) Inventors: Victor Flachs, Rishon Le-Zion (IL); Michal Schramm, Tel Aviv (IL); Leonid Shamis, Herzlia (IL)

(73) Assignee: Winbond Electronics Corporation, Hinschu (TW)

(*) Notice: Subject to any disclaimer, the term of this patent is extended or adjusted under 35 U.S.C. 154(b) by 820 days.

(21) Appl. No.: 11/517,126

(22) Filed: Sep. 6, 2006

(65) Prior Publication Data

US 2008/0056411 A1 Mar. 6, 2008

(51) Int. Cl.
*H04L 27/06* (2006.01)
(52) U.S. Cl. ...................................... 375/340
(58) Field of Classification Search .................. 375/340
See application file for complete search history.

(56) References Cited

U.S. PATENT DOCUMENTS

| | | | |
|---|---|---|---|
| 3,786,360 A | | 1/1974 | Kawa et al. |
| 4,627,080 A | * | 12/1986 | Debus, Jr. ................... 375/359 |
| 5,297,186 A | * | 3/1994 | Dong ......................... 375/222 |
| 5,319,191 A | * | 6/1994 | Crimmins ............... 250/214 R |
| 5,448,596 A | * | 9/1995 | Ezran et al. ................. 375/350 |
| 5,507,040 A | * | 4/1996 | Eaton et al. ............. 455/343.2 |
| 5,684,830 A | | 11/1997 | Ichikawa et al. |
| 5,898,513 A | | 4/1999 | Gist et al. |
| 5,905,761 A | * | 5/1999 | Je et al. ....................... 375/320 |
| 5,917,631 A | | 6/1999 | Shafer |
| 6,407,840 B1 | | 6/2002 | Shien-Te et al. |
| 6,430,358 B1 | * | 8/2002 | Yuen et al. ..................... 386/83 |
| 6,496,549 B1 | | 12/2002 | Crawford |
| 7,508,257 B2 | | 3/2009 | Flachs et al. |
| 2004/0076153 A1 | * | 4/2004 | Hallenbeck ................. 370/389 |
| 2004/0153699 A1 | | 8/2004 | Goldsmith |
| 2004/0208182 A1 | | 10/2004 | Boles et al. |

FOREIGN PATENT DOCUMENTS

JP 2002232495 8/2002

OTHER PUBLICATIONS

National Semiconductor Corporation, "PC87364: 128-Pin LPC SuperI/O with Extended Wake-Up and Protection Support", Revision 2.0., Jul. 2000.
SMSC, "SIO1000: Super I/O with LPC Interface with FIR and Consumer IR Support", Product Review, Revision, Nov. 10, 2004.
SMSC, "USB2231/USB2232: 5th Generation Hi-Speed USB Flash Media and CIR Controller with Integrated Card Power FETs", Data sheet, Revision 1.3, Jul. 12, 2005.

(Continued)

*Primary Examiner*—Juan A Torres
(74) *Attorney, Agent, or Firm*—Darby & Darby P.C.

(57) ABSTRACT

A method for processing a signal envelope generated by demodulating a received signal that includes a train of pulses that is transmitted at a carrier frequency and is modulated at a given baud rate with data symbols in accordance with a predetermined communication protocol, which defines features of the modulated signal. The method includes measuring a duration of a selected feature in the signal envelope as defined by the communication protocol. The baud rate of the signal is estimated based on the measured duration without counting the pulses in the received signal. The data symbols are decoded by processing the signal envelope responsively to the estimated baud rate.

18 Claims, 4 Drawing Sheets

OTHER PUBLICATIONS

SMSC, "FDC37B78x: Super I/O Controller with ACPI Support, Real Time Clock and Consumer IR", Revision Apr. 14, 2005.
SMSC, "LPC47N252: Advanced Notebook I/O Controller with On-Board Flash", Revision Sep. 6, 2000.
SMSC, "IrCC2.0: Infrared Communications Controller", Revision Aug. 26, 1997.
SMSC:, "CIrCC: Consumer Infrared Communications Controller", Revision Dec. 8, 1997.
ITE Tech. Inc., "IT8705F/IT8705AF: Simple Low Pin Count Input/Output (Simple LPC I/O)", Preliminary Specification V0.4.1., year 2005.
Vishay, "TSOP321: IR Receiver Modules for Remote Control Systems", Document No. 82229, Revision 1.2., Jan. 31, 2005.
SB-Projects, "IR remote control: Philips RC-5 Protocol", 2001.
SB-Projects, "IR remote control: Philips RC-6 Protocol", 2005.
SB-Projects, "IR remote control: NEC protocol", 2001.
National Semiconductor Corporation, "DM74LS122 Retriggerable One-Shot with Clear and Complementary Outputs", May 1989.
National Semiconductor Corporation, "9601/DM9601 Retriggerable One Shot", Jun. 1989.

* cited by examiner

US 7,676,003 B2

CARRIER FREQUENCY-INDEPENDENT RECEIVER

FIELD OF THE INVENTION

The present invention relates generally to data communication, and specifically to digital receivers that are capable of operating independently of carrier signal frequency.

BACKGROUND OF THE INVENTION

Consumer electronic devices commonly use infrared (IR) remote control to receive input from a user. A remote controller transmits modulated infrared signals carrying predefined codes that indicate functions that the electronic device is to perform. The device demodulates, samples and decodes the signals in order to carry out the desired functions. There are many different protocols in use, and different manufacturers commonly use different protocols and different data rates for transmission. Common protocols include the RC-5 and RC-6 protocols (developed by Philips) and the NEC protocol (developed by Nippon Electric Corporation). According to these protocols, the transmitter emits a train of IR pulses at a selected carrier frequency, and the train is modulated on and off in accordance with the transmitted codes, as dictated by the protocol, at a selected baud rate.

U.S. Patent Application Publication US 2004/0208182, whose disclosure is incorporated herein by reference, describes a format-independent consumer IR transceiver. The transceiver determines the carrier frequency of an IR input by counting IR pulses. The applicants point out that typical IR carrier frequencies can be as high as 455 kHz or higher, so that sampling of such a signal for direct determination of the carrier frequency would need to take place at approximately 1 MHz or higher. A sampling apparatus capable of sampling at such a rate is relatively expensive, and is therefore disfavored in low-cost IR devices. Instead, the applicants suggest a method of sampling a hardware counter that counts the number of pulses contained in the IR signal, and then performs an algorithm that determines the carrier frequency from the counted pulses and number of samples. The counter is sampled at a slower frequency than the IR input of the transceiver, such as at 16 kHz. The pulse count is used in a run-length encoding process to create values of an encoded envelope. The pulse count and run-length encoding information are sent to a microcontroller, which calculates the carrier frequency.

SUMMARY OF THE INVENTION

Embodiments of the present invention that are disclosed hereinbelow provide methods and devices for determining the baud rate of an encoded signal carried by a modulated pulse train, without requiring pulse counting or direct determination of the pulse train carrier frequency. Rather, the receiving device determines the baud rate by estimating the duration of certain symbols—as defined by the relevant transmission protocol—following demodulation of the pulse train. The receiving device is thus able to determine the sampling times for sampling the symbols contained in the encoded signal. This scheme facilitates low-cost implementation of the receiving device, using a low-frequency sample clock.

The embodiments described hereinbelow are particularly useful in decoding consumer electronic infrared (CEIR) signals, but they may also be used in other data transmission applications, particularly when the protocol to be decoded has a start symbol different from the subsequent data symbols, and provides a limited run-length of consecutive time slots at low and/or high level.

There is therefore provided, in accordance with an embodiment of the present invention, a method for processing a signal envelope generated by demodulating a received signal that includes a train of pulses that is transmitted at a carrier frequency and is modulated at a given baud rate with data symbols in accordance with a predetermined communication protocol, which defines features of the modulated signal, the method including:

measuring a duration of a selected feature in the signal envelope as defined by the communication protocol;

estimating the baud rate of the signal based on the measured duration without counting the pulses in the received signal; and decoding the data symbols by processing the signal envelope responsively to the estimated baud rate.

In a disclosed embodiment, the signal includes an infrared (IR) signal, which is modulated in accordance with a consumer electronic infrared (CEIR) protocol, wherein the CEIR protocol includes one of an RC-5 protocol, an RC-6 protocol, and a NEC protocol.

In some embodiments, demodulating the signal causes a temporal stretch of the envelope relative to a transmission period of the train of pulses making up the selected feature in the modulated signal, and estimating the baud rate includes deducting the temporal stretch from the measured duration in order to estimate the baud rate. In some cases, the temporal stretch depends on an amplitude of the received signal, and deducting the temporal stretch includes determining a mean value of the temporal stretch over a range of amplitudes of the signal, and deducting the mean value from the measured duration.

In a disclosed embodiment, measuring the duration includes counting successive rising and falling edges of a clock signal during the duration of the selected feature.

Typically, measuring the duration includes measuring the duration using a clock signal that is independent of the carrier frequency.

In disclosed embodiments, the communication protocol defines an initial symbol to be transmitted at a start of each message, and the selected feature includes at least a part of the initial symbol. Typically, the communication protocol defines binary cells having a cell duration, each of the data symbols including two or more of the cells, and the communication protocol defines the duration of the selected feature as a predetermined number times the cell duration, and estimating the baud rate includes estimating the cell duration by dividing the measured duration of the selected feature by the predetermined number. In some embodiments, decoding the digital data symbols includes sampling the signal envelope at sampling times selected responsively to the estimated baud rate so as to sample each of the cells.

There is also provided, in accordance with an embodiment of the present invention, apparatus for communication, including:

a demodulator, which is configured to receive a signal including a train of pulses that is transmitted at a carrier frequency and is modulated at a given baud rate with data symbols in accordance with a predetermined communication protocol, which defines features of the modulated signal, and to demodulate the signal to generate a signal envelope;

a synchronizer, which is coupled to measure a duration of a selected feature in the signal envelope as defined by the communication protocol, and to estimate the baud rate of the signal based on the measured duration without counting the pulses in the received signal;

a sampler, which is coupled to sample the signal envelope responsively to the estimated baud rate, so as to generate a sequence of output samples; and a decoder, which is coupled to process the output samples so as to decode the data symbols.

The present invention will be more fully understood from the following detailed description of the embodiments thereof, taken together with the drawings in which:

DETAILED DESCRIPTION OF EMBODIMENTS

Figure 1:
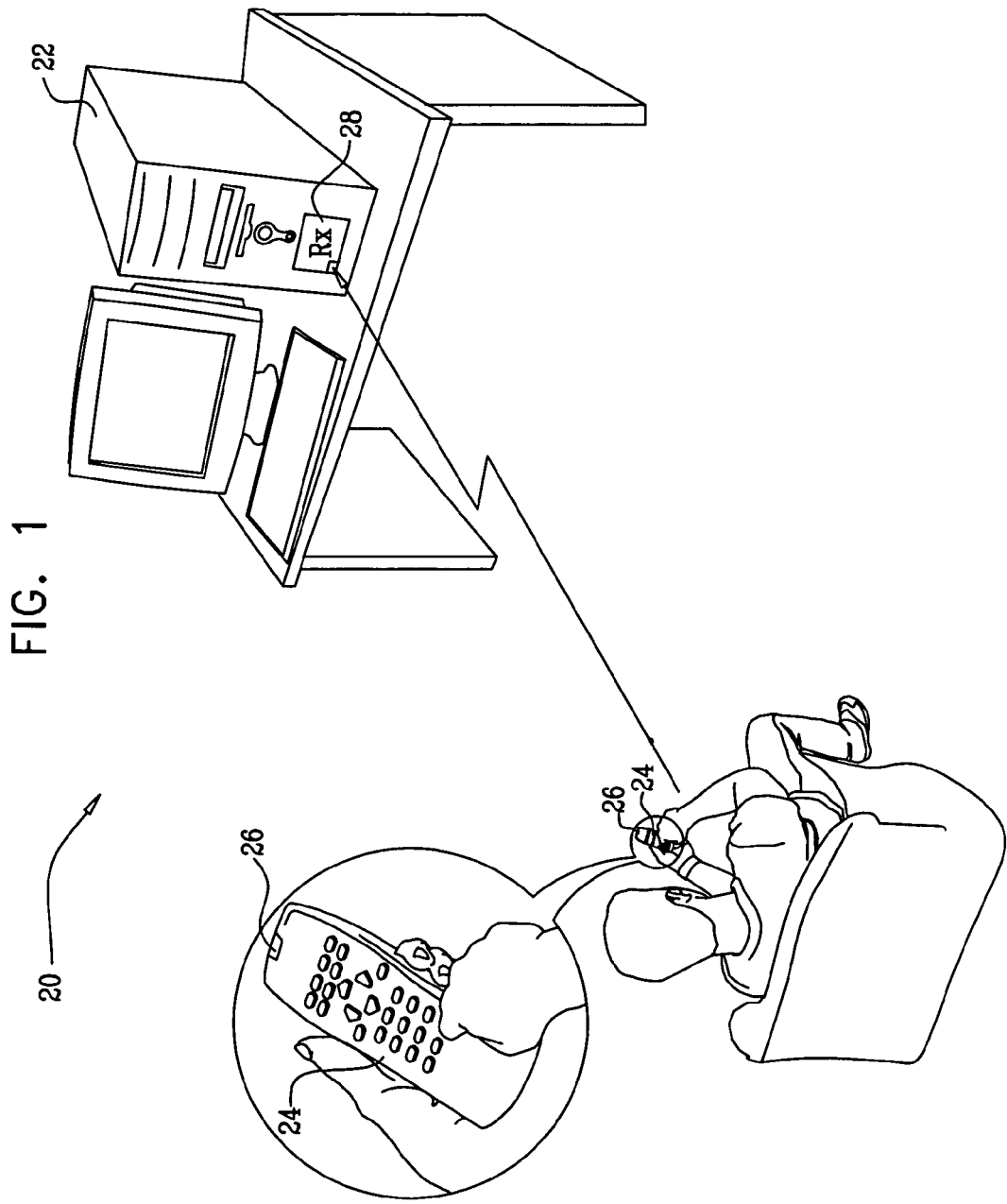
FIG. 1 is a schematic, pictorial illustration of a multimedia system using CEIR remote control, in accordance with an embodiment of the present invention.

FIG. 1 is a schematic, pictorial illustration of a multimedia system 20, in accordance with an embodiment of the present invention. A user of the system controls a multimedia station 22 (such as a suitable computer or video console, for example) using an IR remote control device 24. This device comprises an IR transmitter 26, which emits IR signals comprising a modulated train of IR pulses, in response to actuation by the user of the controls. An IR receiver 28 senses, demodulates, and decodes the IR signals in order to provide instructions to station 22 in accordance with the user's commands.

The IR pulses emitted by transmitter 26 are modulated in accordance with a predetermined protocol, such as the RC-5, RC-6 or NEC CEIR protocols mentioned above. These protocols permit the transmitter to choose a carrier frequency anywhere in the range from 30-56 kHz (with an additional tolerance of up to 10% above or below the range). An identification of the protocol used by transmitter 26 may be input to receiver 28 in advance, typically by setting a switch on station 22 or keying in a configuration input to the station, for example. (Alternatively, the receiver may be programmed to identify the protocol automatically based on features of the signal, but such automatic identification is beyond the scope of the present invention.) The carrier frequency and consequently the baud rate of the transmitted signal, on the other hand, are generally not known to the receiver before transmitter 26 begins to transmit. Rather, the receiver estimates the baud rate by determining the duration of certain symbols in the signals that it receives from the transmitter, as described hereinbelow, and then uses this estimate in sampling and decoding the signals.

Figure 2:
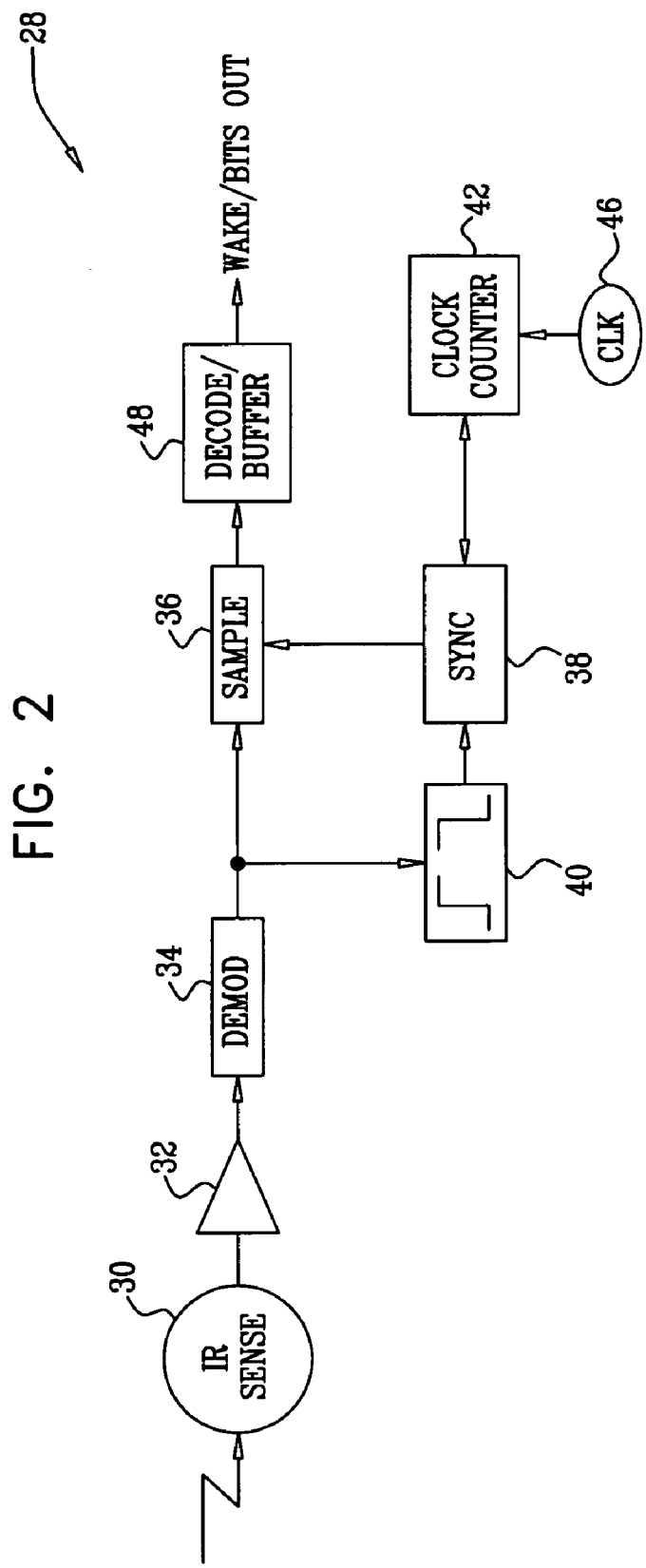
FIG. 2 is a block diagram that schematically shows details of a CEIR receiver, in accordance with an embodiment of the present invention.

FIG. 2 is a block diagram that schematically shows details of receiver 28, in accordance with an embodiment of the present invention. An IR sensor 30, such as a photodiode, generates an electrical output in response to the IR pulses emitted by transmitter 26, and the pulses are amplified by an amplifier 32. A demodulator 34 extracts the envelope of the pulse train (as shown below in FIG. 3). An exemplary method and circuit for envelope extraction are described in a U.S. patent application entitled, "Low-Power Digital Demodulator," filed Sep. 6, 2006 (now U.S. Pat. No. 7,508,257), which is assigned to the assignee of the present patent application, and whose disclosure is incorporated herein by reference. Alternatively, other methods and circuits may be used, as are known in the art.

In order to extract the encoded symbols from the received IR signal, a sampler 36 samples the amplitude of the envelope at times determined by a synchronizer 38. The synchronizer determines these sampling times, using methods that are described in detail hereinbelow, based on the edges in the time-varying envelope, as indicated by an edge detector 40. The synchronizer measures the time between certain edges using a clock counter 42, and thus estimates the baud rate of the IR signal. The clock counter is driven by a local clock 46, which is independent of the clock used in transmitter 26.

To minimize cost, clock 46 may be provided by an existing clock source in station 22. A low-frequency clock source is desirable in order to reduce power consumption. To meet these objectives, it is possible, for example, to use a clock source operating at approximately 32 kHz as is commonly available in personal computers and battery-operated systems. This clock is independent of the carrier frequency used by IR transmitter 26. To double the clock rate, the clock may use both rising and falling edges of the existing clock signal. This use of a low-frequency clock introduces a certain amount of error into the estimated baud rate. Synchronizer 38 takes this potential error into account, as explained hereinbelow, in determining the sampling times that are to be used by sampler 36.

A decoder 48 processes the sequence of samples output by sampler 36 in order to generate a bit sequence that corresponds to the coded commands transmitted by device 24. Before outputting the bit sequence or commands to station 22, the decoder may first send a wakeup signal, instructing the station to power up from a sleep state in order to respond to the user's command. Decoder 48 may comprise a buffer for holding the bit sequence until station 22 has powered up and is ready to receive the data.

The components of receiver 28 that are shown in FIG. 2, other than sensor 30 and amplifier 32, may be realized in either electronic hardware circuits or in software running on a suitable processor, or in a combination of hardware and software components. Although the functional blocks of the receiver are shown, for the sake of conceptual clarity, as separate elements, in practice these blocks may be implemented in a single electronic integrated circuit. All of these various implementations are considered to be within the scope of the present invention.

Figure 3:
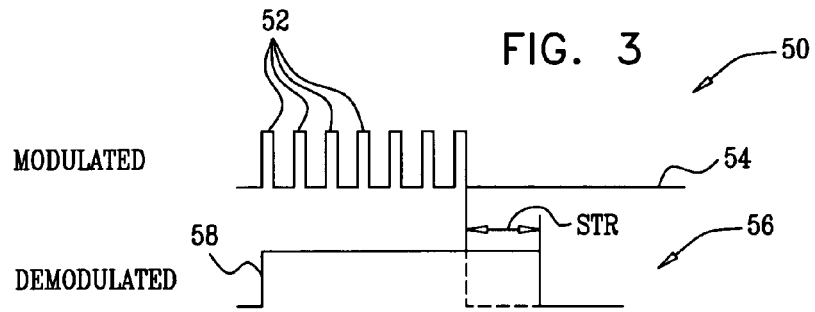
FIG. 3 is a signal timing diagram that schematically shows a modulated pulse train and its demodulated envelope, in accordance with an embodiment of the present invention.

FIG. 3 is a signal timing diagram that schematically illustrates the operation of demodulator 34, in accordance with an embodiment of the present invention. A modulated signal 50 transmitted by transmitter 26 (and similarly, the modulated signal that is input to demodulator 34) comprises a train of pulses 52, which are transmitted at a certain carrier frequency.

As noted above, for the CEIR RC-5, RC-6 and NEC protocols, the carrier frequency may be anywhere in the range from 30 to 56 kHz±10%.

A binary, on-off modulation is applied to the pulse train, including periods in which IR pulses are transmitted (at the left side of signal 50) and periods 54 of no transmission. The periods of IR transmission are conventionally referred to as "Cell 1," while those of no transmission are referred to as "Cell 0." Transmitted symbols are made up of predetermined sequences of the two types of cells. Typically, the two types of cells are of the same duration, which is equal to a fixed number of cycles of the IR carrier. (Therefore, the cell duration varies in inverse proportion to the carrier frequency.)

Demodulator 34 extracts an envelope 56 of modulated signal 50. The envelope has the form of a square wave 58 corresponding to the train of pulses 52 in each Cell 1 period. Typically, demodulator 34 comprises either an analog low-pass filter or digital logic (as described in the above-mentioned patent application entitled "Digital Demodulator"), which smoothes the pulses but also adds a certain "stretch" (STR) following the last pulse in each Cell 1 that precedes a Cell 0. This stretch distorts the timing of the envelope relative to the actual symbol clock. The distortion is taken into account by synchronizer 38 in estimating the baud rate (as described hereinbelow in greater detail) of the transmitted signal.

Figure 4:
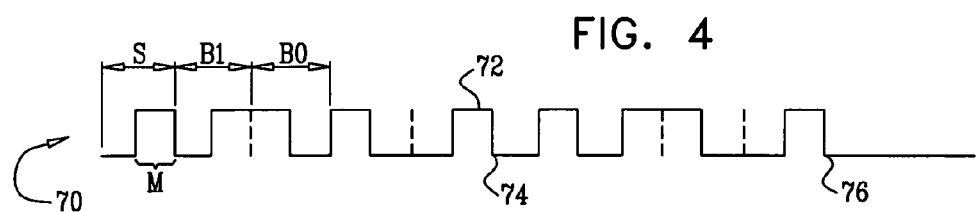
FIGS. 4-6 are signal timing diagrams that schematically illustrate a method for measuring the baud rate of signal envelopes corresponding to different CEIR protocols, in accordance with embodiments of the present invention.
Figure 5:
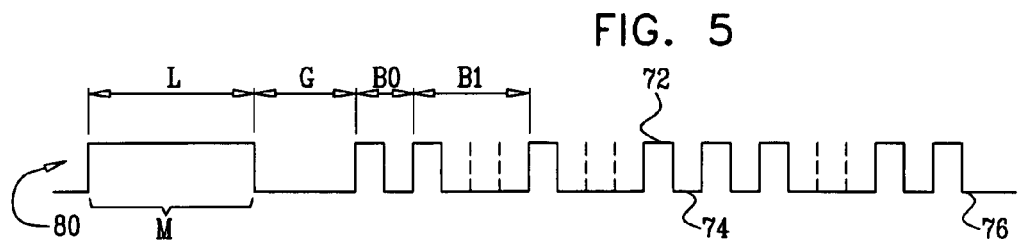
Figure 6:
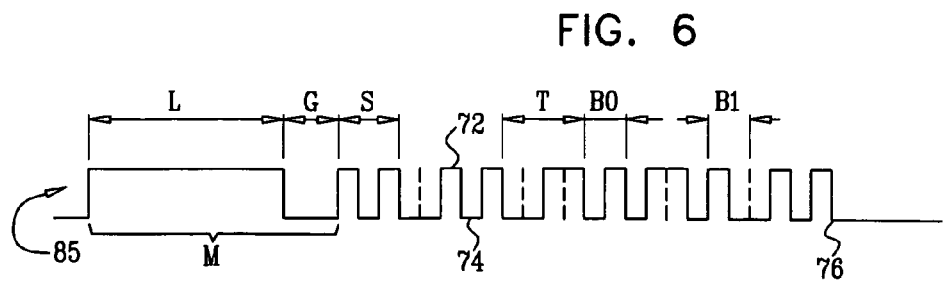

Reference is now made to FIGS. 4-6, which are signal timing diagrams that schematically illustrate message formats used in different CEIR protocols. The diagrams are marked to illustrate a method applied by synchronizer 38 in order to measure the baud rates of received signals, in accordance with an embodiment of the present invention. The measurement is based on the signal envelopes that are output by demodulator 34. FIG. 4 shows an RC-5 protocol message 70; FIG. 5 shows a NEC protocol message 80; and FIG. 6 shows an RC-6 protocol message 85.

Each message starts with a specified control symbol, which may be a start symbol (S) or a leader (L) followed by a gap (G). (RC-6 uses both a leader and a start symbol, as well as a trailer bit (T), but this latter feature of the protocol is outside the scope of the present invention.) Each subsequent data bit (which may have the value 1—marked as B1, or the value zero—marked as B0) is encoded as a predefined sequence of one or more high-level cells 72 and one or more low-level cells 74, corresponding respectively to Cell 1 and Cell 0 mentioned above. The message concludes with a stop or end-of-message symbol 76.

For accurate sampling, it is desirable that synchronizer 38 trigger sampler 36 to sample the demodulated signal envelope near the middle of each cell 72 or 74. To determine the sampling times, without actually counting carrier pulses, synchronizer 38 estimates the cell timing (which is equivalent to estimating the baud rate) of the signal by measuring the duration of the control symbol at the beginning of the message. In the embodiments that are illustrated in FIGS. 4-6, the duration that is measured is marked "M". Alternatively, other message features may be measured. Although this measurement technique is illustrated here with reference to three specific CEIR protocols, the extension of the technique to other protocols and other message features will be straightforward for those skilled in the art and is considered to be within the scope of the present invention.

In the present embodiments, the following features are measured in each case:

In RC-5 (FIG. 4), synchronizer 38 measures the duration of the Cell 1 part of the start bit S. (There may be ambiguity in this measurement, however, as explained below with reference to FIG. 7.) Each RC-5 cell contains thirty-two clock cycles.

In the NEC protocol (FIG. 5), synchronizer 38 measures the duration of the leader L. The protocol specifies that the duration of the leader is 16 times the cell duration. Each cell contains twenty-two clock cycles.

In RC-6 (FIG. 6), the protocol specifies that the duration of the leader L is six cells, while the subsequent gap G is two cells. Therefore, synchronizer 38 measures the combined duration of L and G, which is expected to be eight times the cell duration. Each RC-6 cell contains sixteen clock cycles.

As noted above, the synchronizer makes these measurements by receiving from clock counter 42 a count of the number of cycles of clock 46 (typically using both rising and trailing edges of the clock signal) that elapse between edges sensed by edge detector 40.

Figure 7A:
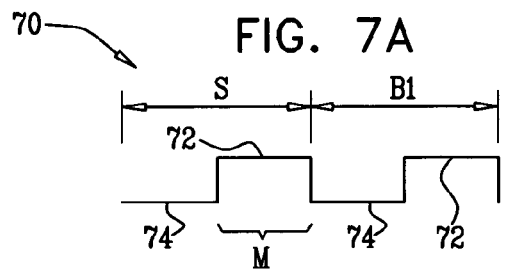
FIGS. 7A and 7B are signal timing diagrams that schematically illustrate baud rate measurements applied to RC-5 signal envelopes, in accordance with an embodiment of the present invention.
Figure 7B:
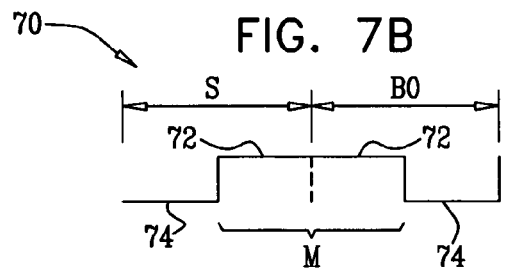

FIGS. 7A and 7B are signal timing diagrams that schematically illustrate baud rate measurements applied to RC-5 signal envelopes, in accordance with an embodiment of the present invention. In FIG. 7A, the start bit S is followed by B1, in which Cell 0 (cell 74) precedes Cell 1 (cell 72), and the edge between S and B1 can thus be clearly detected. On the other hand, in FIG. 7B, S is followed by B0, in which Cell 1 (cell 72) precedes Cell 0 (cell 74), and there is thus no clear delineation between cells 72 in S and B0. Therefore, in this latter case, synchronizer 38 will measure the duration of two successive cells, as shown by the marking "M" in FIG. 7B.

To resolve this potential ambiguity, synchronizer 38 checks the measured cell duration M for RC-5 signals against a programmable maximum value that is based on the actual carrier frequency. If the measured value of M is greater than the maximum value, the clock counter assumes that it has measured the duration of two successive cells 72, as shown in FIG. 7B. In this case, the measurement result M is divided by two in order to determine the cell duration.

To estimate the actual cell duration, synchronizer 38 divides the measured feature duration by an appropriate divisor for each protocol, depending on the expected duration (in cells) of the measured feature, while applying certain corrections for expected measurement errors. As explained above with reference to FIG. 3, the duration of square wave 58 that is output by demodulator 34 is longer than the actual corresponding envelope of the modulated signal by the "stretch" time STR. Therefore, in order to derive the actual duration of the feature to which the measured value M corresponds, the synchronizer may subtract the value of STR from M before dividing to determine the cell duration. If a digital demodulator is used, the value of STR may be known exactly. Otherwise, when the demodulator uses an analog smoothing circuit, STR may vary depending on the intensity (i.e., amplitude) of the received IR signal. In this case, an estimated STR value, such as a mean of the possible stretch durations corresponding to a range of possible amplitudes, may be used.

The accuracy of measurement of M is limited by quantization error due to the low frequency of clock 46. The quantization error of a given measurement may be anywhere between zero and a full clock cycle (or half a full clock cycle, if both rising and falling edges of the clock are used, as described above). To give a symmetrical error distribution in the final result, the synchronizer may add a correction (COR) of one half-cycle (or one quarter-cycle when using rising and falling edges) of clock 46 to its cell duration estimate.

Thus, to summarize, synchronizer 38 outputs the following cell durations (CD) based on the measured duration values M for each of the CEIR protocols that it handles:

RC-5: CD=M−STR+COR, or CD=(M−STR)/2+COR if M is greater than the programmable maximum value for cell duration.

NEC: CD=(M−STR)/16+COR.

RC-6: CD=M/8+COR.

Because the RC-6 measurement is made between rising edges, there is no need to account for the stretch following the trailing edge in calculating the cell duration. Although the inventors have found the signal components and formulas mentioned above to be convenient in determining cell duration, other components and formulas may similarly be used and are considered to be within the scope of the present invention.

Figure 8:
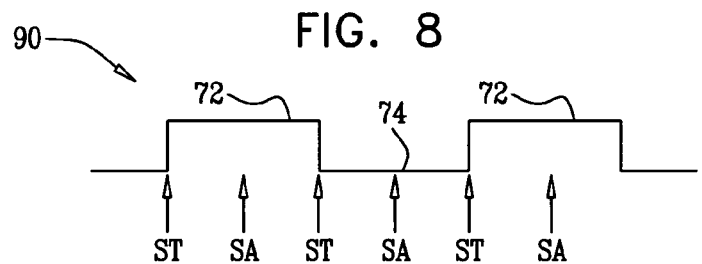
FIGS. 8, 9A and 9B are signal timing diagrams that schematically illustrate a method for sampling demodulated signals, as applied to different signal envelope patterns, in accordance with an embodiment of the present invention.

FIG. 8 is a signal timing diagram that schematically illustrates sampling of a demodulated signal 90 by sampler 36, under the control of synchronizer 38, in accordance with an embodiment of the present invention. Signal 90 in this example comprises high-level cells 72 in alternation with low-level cells 74. Synchronizer 38 triggers clock counter 42 to begin counting clock cycles on each signal transition (marked ST in the figure) that is reported by edge detector 40. When the clock counter gets to half the estimated cell duration value CD, synchronizer 38 instructs sampler 36 to sample the signal (at sample points marked SA in the figure). As a result, each cell is sampled roughly in the middle. At each subsequent transition, the synchronizer restarts the clock cycle count, so that the sampling times remain synchronized with the cells in the signal.

Figure 9A:
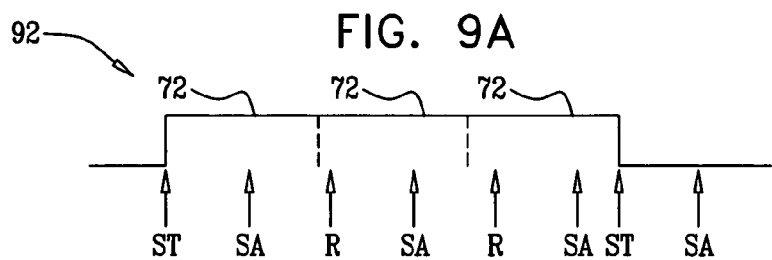
Figure 9B:
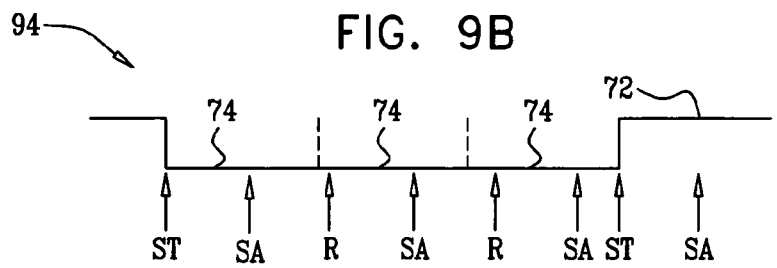

FIGS. 9A and 9B are signal timing diagrams that schematically illustrate sampling of demodulated signals 92 and 94, in which multiple high-level cells 72 or low-level cells 74 occur in succession, in accordance with an embodiment of the present invention. In such cases, there is no signal transition to trigger a restart of the clock cycle count. Instead, when the clock cycle count reaches the value CD, synchronizer 38 autonomously reloads the timer (i.e., restarts the clock counter), at reload points marked R in the figure.

To the extent that the estimated value of CD differs from the actual cell duration in the transmitted signal, the successive sample points SA will cumulatively drift away from the center points of the corresponding cells. The error in the CD estimate may stem, as noted above, from the stretch STR of the demodulated signal and/or from quantization error due to the low rate of clock 46. The error may be mitigated by measuring the duration M over a large number of cell periods (as in FIGS. 5 and 6), thus giving a more accurate estimate of CD.

Each of the CEIR protocols imposes a limit on the maximal number of cells that may be contained in a single message, and this maximal number, multiplied by the maximum possible error in the CD estimate, gives the maximum cumulative drift that may occur. The clock rate and stretch parameters are typically chosen, along with the number of cells over which M is measured, so that the maximum cumulative drift does not reach CD/2, thereby ensuring that all cells will be properly sampled.

Although the embodiments described above refer to certain specific protocols, the principles of the present invention may similarly be applied, mutatis mutandis, in sampling signal envelopes of other kinds, subject to different protocols. The techniques described above are useful particularly when the protocol to be decoded has a start symbol different from the subsequent data symbols, and provides a limited run-length of consecutive time slots at low and/or high level. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing a signal envelope generated by demodulating a received signal that includes a train of pulses that is transmitted at a carrier frequency and is modulated at a given baud rate with data symbols in accordance with a predetermined communication protocol, which defines features of the modulated signal, the method comprising:

measuring a duration of a selected feature in the signal envelope as defined by the communication protocol;

estimating the baud rate of the signal based on the measured duration without counting the pulses in the received signal; and decoding the data symbols by processing the signal envelope responsively to the estimated baud rate, wherein demodulating the signal causes a temporal stretch of the envelope relative to a transmission period of the train of pulses making up the selected feature in the modulated signal, and wherein estimating the baud rate comprises deducting the temporal stretch from the measured duration in order to estimate the baud rate.

2. The method according to claim 1, wherein the signal comprises an infrared (IR) signal, which is modulated in accordance with a consumer electronic infrared (CEIR) protocol.

3. The method according to claim 2, wherein the CEIR protocol comprises one of an RC-5 protocol, an RC-6 protocol, and a NEC protocol.

4. The method according to claim 1, wherein the temporal stretch depends on an amplitude of the received signal, and wherein deducting the temporal stretch comprises determining a mean value of the temporal stretch over a range of amplitudes of the signal, and deducting the mean value from the measured duration.

5. The method according to claim 1, wherein measuring the duration comprises counting successive rising and falling edges of a clock signal during the duration of the selected feature.

6. The method according to claim 1, wherein measuring the duration comprises measuring the duration using a clock signal that is independent of the carrier frequency.

7. The method according to claim 1, wherein the communication protocol defines an initial symbol to be transmitted at a start of each message, and wherein the selected feature comprises at least a part of the initial symbol.

8. The method according to claim 7, wherein the communication protocol defines binary cells having a cell duration, each of the data symbols comprising two or more of the cells, and the communication protocol defines the duration of the selected feature as a predetermined number times the cell duration, and wherein estimating the baud rate comprises estimating the cell duration by dividing the measured duration of the selected feature by the predetermined number.

9. The method according to claim 1, wherein the communication protocol defines binary cells having a cell duration, each of the data symbols comprising two or more of the cells, wherein decoding the digital data symbols comprises sampling the signal envelope at sampling times selected responsively to the estimated baud rate so as to sample each of the cells.

10. Apparatus for communication, comprising:
a demodulator, which is configured to receive a signal comprising a train of pulses that is transmitted at a carrier frequency and is modulated at a given baud rate with data symbols in accordance with a predetermined communication protocol, which defines features of the modulated signal, and to demodulate the signal to generate a signal envelope;
a synchronizer, which is coupled to measure a duration of a selected feature in the signal envelope as defined by the communication protocol, and to estimate the baud rate of the signal based on the measured duration without counting the pulses in the received signal;
a sampler, which is coupled to sample the signal envelope responsively to the estimated baud rate, so as to generate a sequence of output samples; and
a decoder, which is coupled to process the output samples so as to decode the data symbols,
wherein the demodulator causes a temporal stretch of the envelope relative to a transmission period of the train of pulses making up the selected feature in the modulated signal, and wherein the synchronizer is arranged to subtract the temporal stretch from the measured duration in order to estimate the baud rate.

11. The apparatus according to claim 10, wherein the signal comprises an infrared (IR) signal, which is modulated in accordance with a consumer electronic infrared (CEIR) protocol.

12. The apparatus according to claim 11, wherein the CEIR protocol comprises one of an RC-5 protocol, an RC-6 protocol, and a NEC protocol.

13. The apparatus according to claim 10, wherein the temporal stretch depends on an amplitude of the received signal, and wherein the synchronizer is arranged to deduct a mean value of the temporal stretch, taken over a range of amplitudes of the signal, from the measured duration.

14. The apparatus according to claim 10, wherein the synchronizer is arranged to measure the duration based on a count of successive rising and falling edges of a clock signal during the duration of the selected feature.

15. The apparatus according to claim 10, wherein the synchronizer is arranged to measure the duration using a clock signal that is independent of the carrier frequency.

16. The apparatus according to claim 10, wherein the communication protocol defines an initial symbol to be transmitted at a start of each message, and wherein the selected feature comprises at least a part of the initial symbol.

17. The apparatus according to claim 16, wherein the communication protocol defines binary cells having a cell duration, each of the data symbols comprising two or more of the cells, and the communication protocol defines the duration of the selected feature as a predetermined number times the cell duration, and wherein the synchronizer is arranged to estimate the cell duration by dividing the measured duration of the selected feature by the predetermined number.

18. The apparatus according to claim 10, wherein the communication protocol defines binary cells having a cell duration, each of the data symbols comprising two or more of the cells, wherein the sampler is arranged to sample the signal envelope at sampling times selected responsively to the estimated baud rate so as to sample each of the cells.

* * * * *